United States Patent
Barbu et al.

(10) Patent No.: US 10,597,262 B2
(45) Date of Patent: Mar. 24, 2020

(54) PIPE HANDLING APPARATUS

(71) Applicant: BALLTEC LIMITED, Morecambe (GB)

(72) Inventors: Sorin Barbu; James Staveley, Wray (GB); Jonathan Jackson, Poulton-le-Fylde (GB)

(73) Assignee: BALLTEC LIMITED, Morecambe, Lancashire (GB)

( * ) Notice: Subject to any disclaimer, the term of this patent is extended or adjusted under 35 U.S.C. 154(b) by 0 days.

(21) Appl. No.: 16/095,305

(22) PCT Filed: Apr. 18, 2017

(86) PCT No.: PCT/GB2017/051064
§ 371 (c)(1),
(2) Date: Oct. 19, 2018

(87) PCT Pub. No.: WO2017/182785
PCT Pub. Date: Oct. 26, 2017

(65) Prior Publication Data
US 2019/0135588 A1  May 9, 2019

(30) Foreign Application Priority Data
Apr. 18, 2016  (GB) .................................. 1606719.1

(51) Int. Cl.
*B66C 1/42* (2006.01)
*F16L 1/12* (2006.01)
(Continued)

(52) U.S. Cl.
CPC .............. *B66C 1/447* (2013.01); *F16L 1/166* (2013.01); *F16L 1/20* (2013.01)

(58) Field of Classification Search
CPC .. B66C 1/447; F16L 1/166; F16L 1/20; E21B 19/07; E21B 31/18; E21B 31/20
(Continued)

(56) References Cited

U.S. PATENT DOCUMENTS 1,421,266 A * 6/1922 Loman ..................... E21B 31/18
294/86.12
1,528,145 A * 3/1925 Davidson ................. E21B 31/12
294/102.1
(Continued)

FOREIGN PATENT DOCUMENTS

CN          102322548 B   8/2013
GB            2529739 A   3/2016

OTHER PUBLICATIONS

International Search Report and Written Opinion for PCT/GB2017/051064 dated Oct. 26, 2017; 13 pages.
Marwood Group Ltd.; Pipe Clamps product detail (2016), 2 pages.

*Primary Examiner* — Dean J Kramer
(74) *Attorney, Agent, or Firm* — Schwabe Williamson & Wyatt, PC (57) ABSTRACT

Pipe handling apparatus with an insert (4) configured to be inserted into a pipe to be handled (23). One or more clamping members (19) are moveably mounted relative to the insert. One or more actuators (17) are operable to urge the clamping members (19) towards the insert (4) thereby to grip the wall of the pipe to be handled (23). The insert (4) may be cylindrical. Multiple clamping members (19) may be spaced around the insert (4). The clamping members (19) may extend axially along the insert (4). The apparatus is suitable for handling flexible pipes (23) formed from multiple layers of helically wound metal strands.

20 Claims, 5 Drawing Sheets

(51) Int. Cl.
*B66C 1/44* (2006.01)
*F16L 1/16* (2006.01)
*F16L 1/20* (2006.01)

(58) Field of Classification Search
USPC .................................. 294/102.2, 86.12, 86.3
See application file for complete search history.

(56) References Cited

U.S. PATENT DOCUMENTS

| | | | |
|---|---|---|---|
| 3,751,932 A | 8/1973 | Matthews, Jr. | |
| 4,257,719 A | 3/1981 | Hunt | |
| 4,580,826 A * | 4/1986 | Carver | E21B 31/20 |
| | | | 294/86.12 |
| 5,188,483 A | 2/1993 | Kopp | |
| 5,642,912 A * | 7/1997 | Parish, II | B66C 1/56 |
| | | | 294/86.12 |
| 6,142,545 A * | 11/2000 | Penman | E21B 7/046 |
| | | | 294/86.12 |
| 6,311,792 B1 * | 11/2001 | Scott | E21B 19/10 |
| | | | 166/379 |
| 7,503,388 B2 * | 3/2009 | Fay | E21B 31/18 |
| | | | 166/301 |
| 7,744,140 B2 * | 6/2010 | Rowley | F16B 7/025 |
| | | | 294/94 |
| 8,002,032 B2 * | 8/2011 | Cenac | E21B 33/037 |
| | | | 166/250.08 |
| 9,175,524 B2 * | 11/2015 | Leman | E21B 17/03 |
| 2004/0108739 A1 * | 6/2004 | Beeman | E21B 7/061 |
| | | | 294/86.12 |
| 2008/0007056 A1 * | 1/2008 | Beesley | E21B 17/017 |
| | | | 285/321 |
| 2009/0114398 A1 | 5/2009 | Buytaert | |
| 2015/0159444 A1 | 6/2015 | Stankovic | |

* cited by examiner

PIPE HANDLING APPARATUS

CROSS-REFERENCE TO RELATED APPLICATION

The present application is a national phase entry under 35 U.S.C. § 371 of International Application No. PCT/GB2017/051064, filed Apr. 18, 2017, which designates the United States of America, which claims priority to GB Application No. 1606719.1, filed Apr. 18, 2016, the entire disclosures of each of these applications are hereby incorporated by reference in their entireties and for all purposes.

TECHNICAL FIELD OF THE INVENTION

The present invention relates to pipe handling apparatus suitable for handling flexible pipes and pipelines. It also relates to a pipeline recovery tool.

BACKGROUND TO THE INVENTION

Pipelines used for oil and gas production may be formed from lengths of solid steel pipe welded together. Such pipelines can be handled using apparatus which grips the pipe externally, or internally. In each case a tool is urged into contact with a surface of the pipe. The strength of the pipe is such that a sufficient force can be applied by the tool so that static friction between the pipe and the tool enables the tool to be used to lift a significant mass of pipe. In the case of a pipeline being recovered from the sea bed this may be several hundred tonnes.

An alternative to the use of relatively rigid solid steel pipe is so called flexible pipe. This are used in applications where a pipeline will be subject to significant movement, such as in the case of risers running from the sea bed to a production platform. This flexible pipe is formed of multiple metal and polymer layers, and typically includes multiple layers of parallel helically wound steel strands with a polymer liner and sheath. Such pipe is significantly more flexible than solid steel pipe and so more resistant to fatigue in use. However, this flexibility renders the pipe difficult to handle using conventional tools. Owing to its flexibility it is not possible for conventional tools to grip either the outside or inside surface of the pipe with sufficient force to enable a significant mass of pipe to be lifted, because the pipe flexes under the application of pressure limiting the amount of friction which can be achieved between tool and pipe. Consequently, conventional pipe handling tools intended for use with solid steel pipe can only reliably lift flexible pipe with a mass in the order of tens, rather than hundreds, of tonnes making it unsuitable for pipeline recovery operations.

Embodiments of the present invention seek to address this problem.

SUMMARY OF THE INVENTION

According to an aspect of the invention there is provided pipe handling apparatus comprising: an insert configured to be inserted into a pipe to be handled or a receptacle configured to receive a pipe to be handled; a plurality of clamping members moveably mounted relative to the insert or receptacle; and an actuator operable to urge the clamping members towards the insert or receptacle thereby to grip the wall of the pipe to be handled between the clamping members and the insert or receptacle.

As the wall of a pipe is gripped between different parts of the apparatus, inherent hoop strength of the pipe is not relied upon to obtain a hold on the pipe. This enables the apparatus to be used to handle a greater mass of flexible pipe than is possible with conventional pipe handling apparatus.

There may be 3, 4, 5, 6, 7 or 8 clamping members. The clamping members may be disposed so that, in use, they contact the pipe to be handled at positions circumferentially around the wall of the pipe. The positions may be substantially evenly spaced apart.

Each clamping member may have a clamping surface which, in use, is brought into contact with the pipe to be handled. The clamping surface may comprise teeth, grooves or other formations to increase grip between the clamping member and the pipe to be handled. The clamping surface may comprise ball bearings. Ball bearings may be partially embedded into the clamping surface.

The clamping surface of one, more or each clamping member may be arranged to extend axially along the length of a pipe to be handled. The clamping surface may be elongate. An elongate clamping surface may be arranged so that, in use, its long axis is substantially aligned with the axis of the pipe to be handled. Arranging for the clamping surface to extend along the axis of a pipe to be handled ensures that the surface overlies multiple different strands of multiple helically wound strands forming a pipe. This enables mass of the pipe to be supported by multiple strands and thus increases the mass of pipe which can be supported.

One, more or each clamping member may have a wedge-shaped profile. The profile may taper to the clamping surface.

Where the pipe handling apparatus comprises an insert the/or each clamping member may be arranged to move radially inwardly towards the outside surface of a pipe into which the insert is introduced in order to grip the pipe. Where the pipe handling comprises a receptacle the/or each clamping member may be arranged to move radially outwardly towards an inside surface of a pipe which is inserted into the receptacle in order to grip the pipe.

Where the pipe handling apparatus comprises an insert, the insert may be substantially cylindrical. The diameter of the insert may taper towards a free end to facilitate its insertion into a pipe to be handled. The insert may be formed from a tube.

The insert may comprise one or more recesses and one, more or each clamping member may be directed towards a respective recess. For example, where the clamping members have elongate, axially extending, clamping surfaces the insert may comprise a respective elongate axially extending recess in its surface for each clamping member.

The insert may be disposed substantially coaxially within an outer tube, so a space for receiving the pipe to be handled is defined between the insert and the outer tube. The space may be substantially annular. The outer tube may have a closed end. The insert may be secured to the closed end of the outer tube. The insert may be secured by way of a flange extending around an end of the insert. The opposite end of the insert may extend from the outer tube. One or more apertures may be formed in a wall of the outer tube and one, more or each clamping member may extend through, and be moveable relative to, a respective aperture in directions towards and away from the insert. One, more or each clamping member may extend through an aperture in the outer tube with a sliding fit. One, more or each aperture may be an elongate slot. The long axis of the/or each elongate slot may be aligned with the axis of the outer tube.

The pipe handling apparatus may further comprise a frame or body which is movable relative to the insert and/or outer tube. The movement may be substantially parallel to the axis of the outer tube and/or insert. The frame or body may comprise one or more cam surfaces and each clamping member may be in contact with a respective cam surface. One, more or each clamping member may be slidably mounted to a respective cam surface. The apparatus may be arranged such that movement of the frame or body relative to the insert and/or outer tube causes one, more or each clamping member to move towards or away from the insert. The/or each cam surface may extend at an angle of between 15 to 85, 15 to 50 or 15 to 25 degrees relative to the axis of the insert.

The actuator may be disposed between the insert and/or outer tube and the frame or body and arranged to effect relative moment between the insert and/or outer tube and the frame or body. Any suitable actuator may be used. The actuator may be a linear actuator and may comprise one or more piston and cylinder assemblies disposed between the frame or body and a flange on the outer tube.

According to another aspect of the invention there is provided a flexible pipeline recovery tool comprising pipe handling apparatus according to the invention with or without any of its optional features.

According to another aspect of the invention there is provided a method of handling a flexible pipe comprising multiple layers of metal strands comprising the steps of:

providing pipe handling apparatus according to the invention with or without any of its optional features;

introducing the insert into an end of the pipe to be handled or introducing the pipe to be handled into the receptacle; and operating the actuator thereby to grip the pipe.

DETAILED DESCRIPTION OF THE INVENTION

In order that the invention may be more clearly understood an embodiment thereof will now be described, by way of example only, with reference to the accompanying drawings, of which.

Referring to the drawings, pipe handling apparatus comprises an outer substantially cylindrical tube 1, with a substantially annular cross-section, for receiving the end of a length of flexible pipe to be handled. One end of the tube is open and the other is closed. A square flange 2 with curved corners extends around the open end. An aperture extends through the flange at each of its corners. Four elongate slots 3 of substantially the same length are formed in the tube 1. The elongate slots extend parallel to the axis of the tube and are evenly spaced around its circumference. Each slot 3 extends over about half the length of the tube from close to the open end of the tube.

An inner, substantially cylindrical, tube 4, with a substantially annular cross-section extends coaxially within the outer tube 1. The inner tube 1 has a closed end surrounded by a circular flange 5. The flange 5 abuts the closed end of the outer tube 1 and bolts 6 or other suitable fasteners extend through the flange 5 into the closed end of the outer tube 1 to mount the inner tube 4 within the outer tube. The opposite end of the inner tube 4 is open and extends slightly beyond the flange 2 of the outer tube. The wall of the part of the inner tube 4 which extends beyond the flange 2 of the outer tube is chamfered, so that its outside diameter reduces towards the end the of the tube. Four elongate recesses 7 of substantially the same length are formed in the outside surface of the inner tube 4. The recesses 7 extend parallel to the axis of the tube and are evenly spaced around its circumference. Each recess 7 is aligned with a respective slot 3 in the outer tube 1, is slightly longer than the slot 3 and positioned so that the recess extends axially beyond the end of both ends of the slot. The recesses 7 have a generally concave cross-section and a depth which is substantially constant over the major part of the length of the indentation, gradually reducing at each end of the recess.

The outer tube 1 is mounted in a frame. The frame comprises two forked members, each formed from metal plate. The first forked 8 member has a generally triangular part with an aperture 9 extending through it near to the apex of the triangle forming a lifting eye via which the apparatus, and any pipe to be handled by the apparatus, can be lifted. A parallel sided slot is cut into the base of the triangular part which accommodates the closed end of the outer tube 1 with a sliding fit. A narrower parallel sided slot is cut into the base of this slot 10 into which the second forked member 13 is fixed, so that the second forked member 13 extends in a plane substantially at right angles to the first forked member. Two prongs 11 extend from the triangular part of the first forked member 8. The two prongs extend from respective opposite sides of the base of the triangular part and are angled to extend towards each other as they extend away from the base of the triangular part. The ends of the prongs 11 remote from the triangular part are fixed to a generally annular ring 12. The ring 12 is formed from metal plate and extends in a plane perpendicular to that of the first forked member 11 and the axis of the outer 1 and inner 4 tubes.

The second forked member 13 is similar in shape to the first forked member 11, save that it is missing an apex to the triangular shaped part which is, instead, trapezoidal in shape so as to be received into the narrower slot in the first forked member 11 so that it extends in a plane perpendicular to both the first forked member 11 and the ring 12. The prongs 14 of the second forked member are also connected to the ring 12. The second forked member also receives the outer tube 1 with a sliding fit.

All four prongs 11, 14 extend through a respective slot in a support plate 15 to which they are fixed. The support plate 15 is generally square with chamfered corners. An aperture is formed through the centre of the plate, through which the outer tube 1 extends, with the slots through which the prongs extend opening out into the aperture. The support plate 15 is generally parallel to the ring 12 and spaced from the ring to that is approximately half way along the length of the prongs.

A respective clamping member 19 is slidably mounted to the face of each prong 11, 14 which faces the outer tube 1. Each clamping member comprises an elongate metal plate with a tapering width. The two shorter sides of the plate are substantially parallel. One of the longer sides is substantially perpendicular to the two shorter sides. The thickness of the plate tapers towards this side forming a wedge shape terminating in a relatively narrow clamping edge and ball bearings 20 are embedded in this edge. A groove is formed along the length of the opposite longer edge with the sides of the groove undercut to form two opposed rails 21. These rails 21 are received into respective grooves 22 formed in opposite sides of each prong 11, 14 adjacent, but spaced from, and parallel to, the inner edge of each prong. This formation serves to capture each clamping member 19 into a respective prong and allows the clamping member to slide relative to the prong. The two longer sides of each clamping member extend at angle of approximately 20 degrees relative to each other, which corresponds to the angle at which the inner face of each prong extends relative to the axis of the outer tube. Consequently the inwardly directed edge of each clamping member, forming the clamping surface, extends parallel to the axis of the outer tube 1.

Each clamping member 19 extends through a respective elongate slot 3 in the outer tube 1 with a close sliding fit.

Four hydraulic cylinders 16 are mounted to the surface of the support plate 15 which faces the ring 12, one between each adjacent pair of prongs 11, 14, with the axis of each cylinder being parallel to the axis of the outer tube. Each hydraulic cylinder houses a piston connected to a piston rod 17 which extends through an aperture in the ring 12 and is connected to the square flange 2 of the outer tube 1. Bolts 18 extend through the apertures in the flange 2 and into the piston rods 17 to secure the rods to the ring. The hydraulic cylinders 16 are operable to move the flange 2 and thus the outer tube 1 relative to the frame with the flange 2 remaining substantially parallel to the ring 12.

Figure 1:
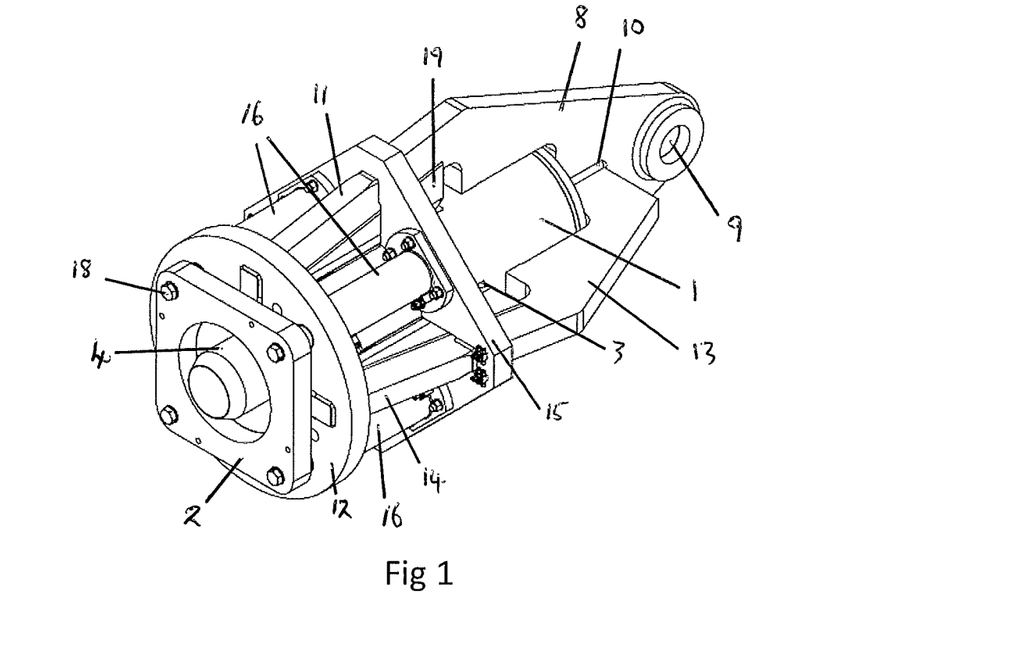
FIG. 1 is a perspective view of pipe handling apparatus.
Figure 2:
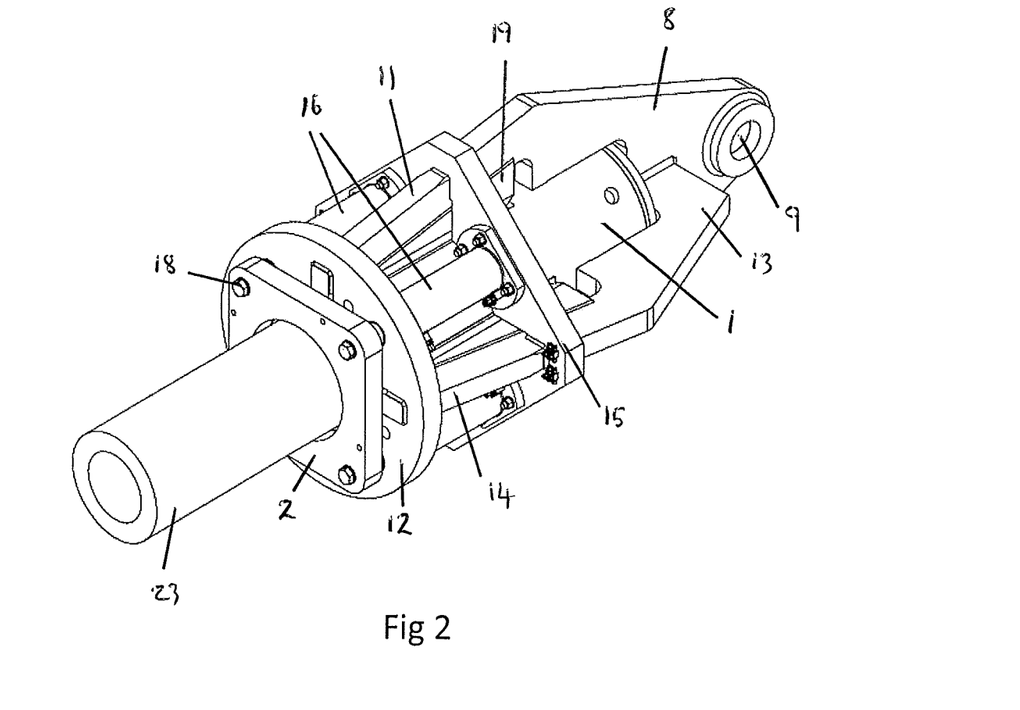
FIG. 2 corresponds to FIG. 1, but additionally shows a length of flexible pipe received into the apparatus.
Figure 3:
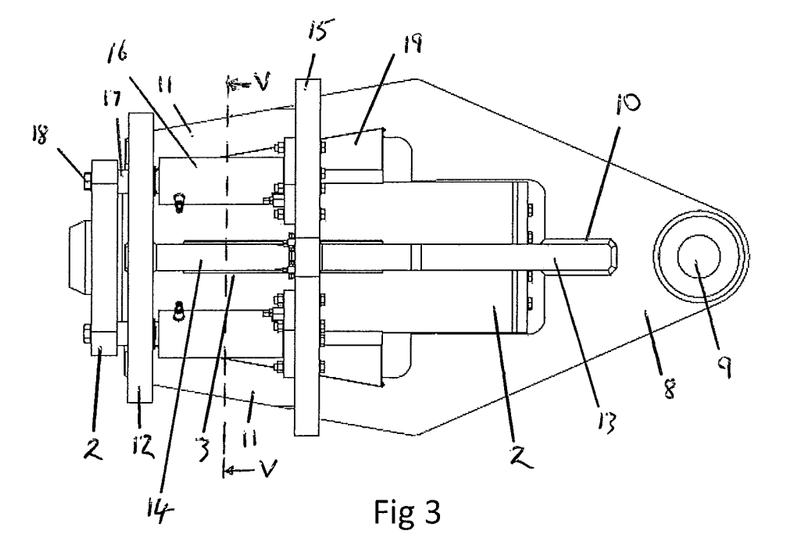
FIG. 3 is a side elevation of the apparatus of FIG. 1.
Figure 4:
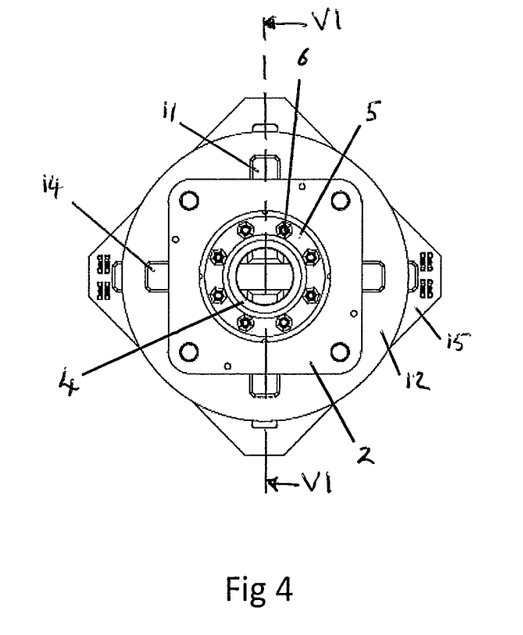
FIG. 4 is an end elevation of the apparatus of FIG. 1.
Figure 5:
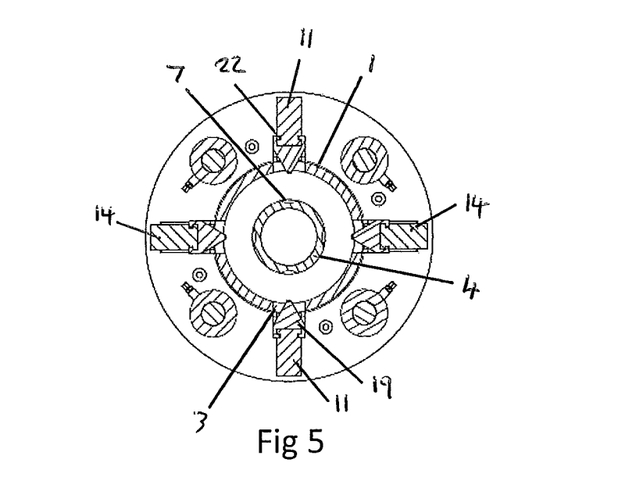
FIG. 5 is a cross-section along the line V-V of FIG. 3.
Figure 6:
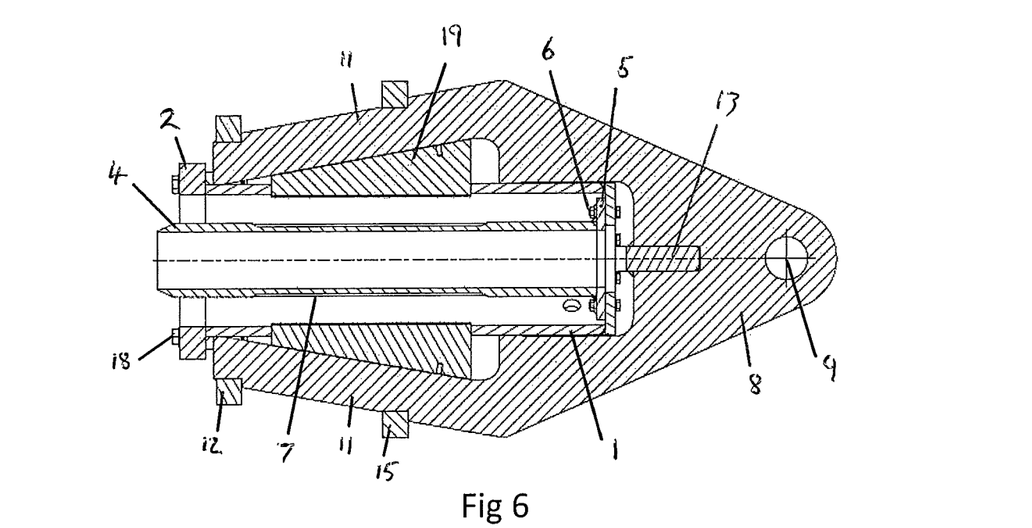
FIG. 6 is a cross-section along the line VI-VI of FIG. 4.
Figure 7:
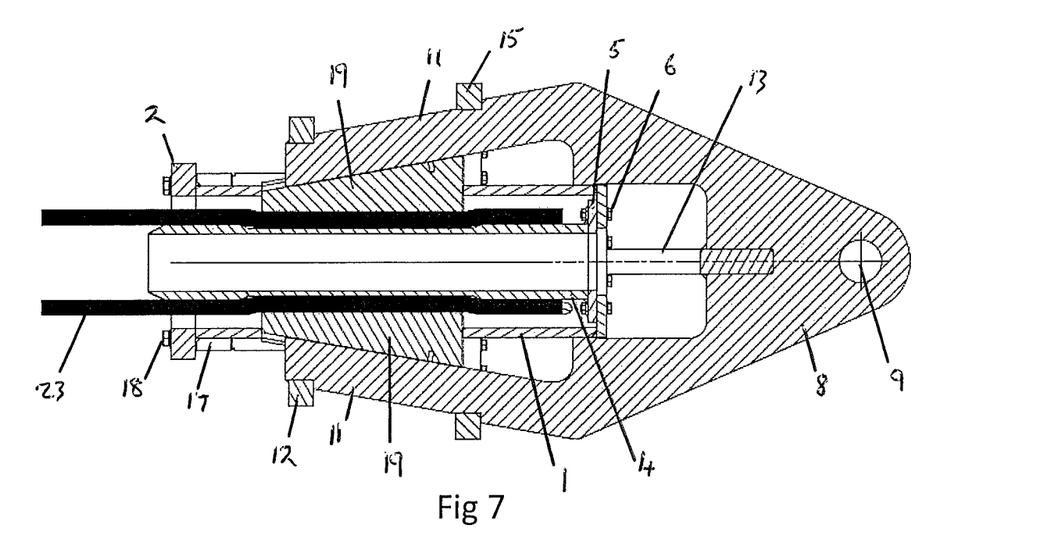
FIG. 7 corresponds to FIG. 6, but additionally shows a length of flexible pipe received into the apparatus.
Figure 8:
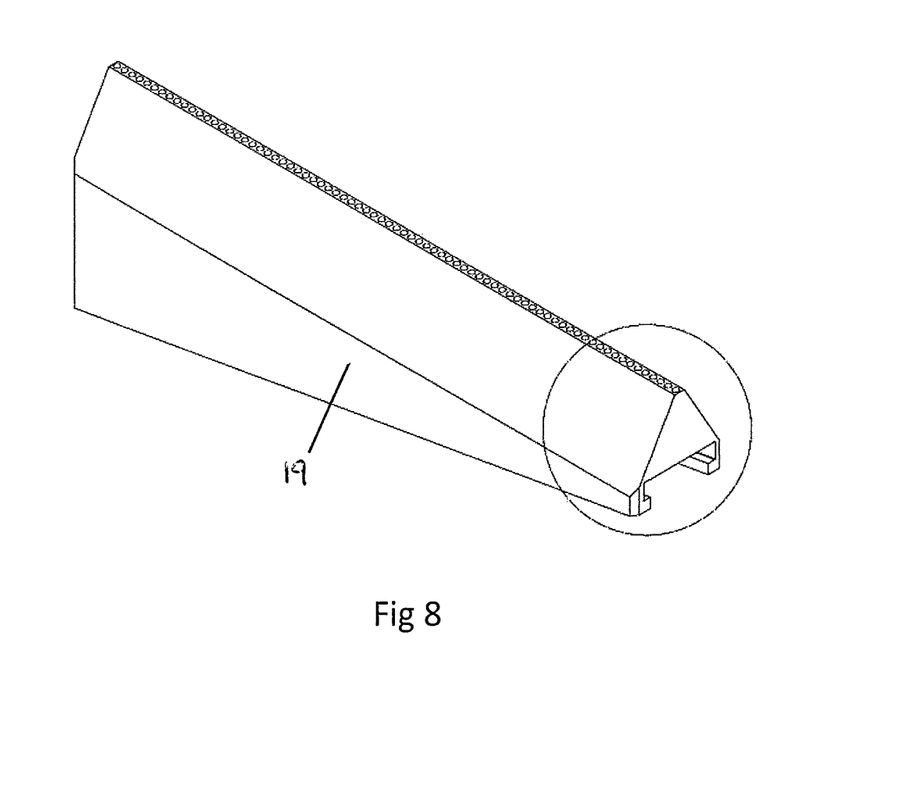
FIG. 8 is a perspective view of a clamping member of the apparatus of FIG. 1.
Figure 9:
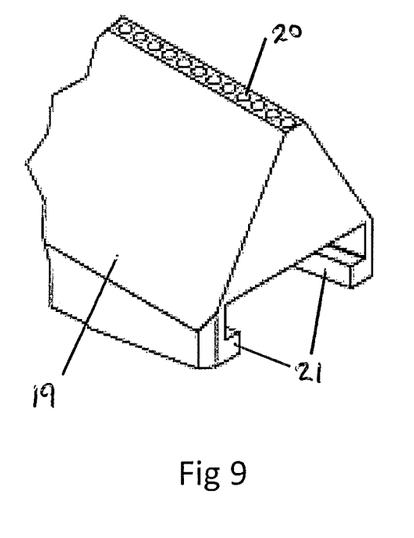
FIG. 9 is an enlargement of the circled part of FIG. 8.

When the pistons are fully retracted into the cylinders 16 the outer tube 1 moves almost fully into the slots in the forked members 8, 10 and the flange 2 approaches the ring 12 as shown in FIGS. 1 to 3 and 6. This constitutes the released state of the apparatus. When the cylinders 16 are energised and the pistons urged out of the cylinders to their fullest extent the outer tube 1 and the frame are urged away from each other into the position shown in FIG. 7, the engaged state of the apparatus.

As the apparatus is moved between the released and engaged states the outer tube 1 is moved relative to the frame. As the clamping members 19 extend through the slots 3 in the outer tube 1 they move axially with the tube, causing them to slide along the prongs 11, 14. The inner surfaces of the prongs act as cam surfaces. They approach the outer tube 1 as they approach the ring 12. Thus, movement of the clamping members 19 along the prongs causes them to move radially too. When the apparatus is in the retracted state the clamping members 19 are at their radially outermost position. When the apparatus is in the engaged state the clamping members are in their radially innermost position at which their radially inner edges extend into the respective recesses 7 in the inner tube 4.

The apparatus is employed to handle pipes, especially flexible pipes formed from multiple layers of metal strands. The apparatus is particularly useful for recovering flexible pipes from a sea bed.

In use, a pipe 23 to be recovered is inserted over the inner tube 4 and into the outer tube 1 of the apparatus with the apparatus in the retracted state. The pipe is inserted sufficiently far so that it extends beyond the recesses 7 on the surface of the inner tube, and ideally is inserted so that it extends all the way to the closed end of the outer tube 1.

Then, the hydraulic cylinders 16 are energised, by pressurising them with fluid from an external source, to urge the apparatus towards, and possibly into, the engaged state. This urges the clamping members 19 radially inwards towards the inner tube 4, causing the flexible pipe to be clamped between the clamping members and the inner tube. Owing to the force applied and the relatively narrow edge of the clamping members 19 the clamping members will tend to cut through any polymer layer(s) of the flexible pipe, typically an outer polymer sheath, and come into contact with the steel strands beneath, gripping them between the clamping members and the inner tube 2. The balls embedded in the clamping surfaces facilitate cutting through any polymer layers and in obtaining a firm grip on metal strands or other load bearing components of the flexible pipe. Thus load bearing components, particularly steel strands, of the flexible pipe are firmly gripped between the clamping members and the inner tube. As the clamping surfaces extend axially along the pipe a grip will be established on multiple different steel strands of the pipe, enabling a greater load of pipe to be supported. As the clamping members are urged towards the inner tube they will urge the flexible pipe into the recesses 7 in the inner tube 2 which further increases purchase on the pipe.

When the hydraulic cylinders have been energised 16 the pipe can be lifted by lifting the apparatus via the aperture 9.

When the pipe has been recovered the apparatus can be released from the pipe by de-energising the hydraulic cylinders 16 to return the apparatus to the retracted state releasing a grip on the pipe.

Because the apparatus grips pipe between components, i.e. between the clamping members and the inner tube 2, flexibility of the pipe does not prevent a firm grip being made on the pipe which, in practice, enables masses of pipe of the order of hundreds of tonnes to be lifted using the apparatus.

The above embodiment is described by way of example only. Many variations are possible without departing from the scope of the invention as defined in the appended claims.

The invention claimed is:

1. Pipe handling apparatus for recovering a flexible pipe from a seabed, comprising: an insert configured to be inserted into a pipe to be handled; a plurality of clamping members moveably mounted relative to the insert; and an actuator operable to urge the clamping members towards the insert such that the wall of the pipe to be handled can be gripped by the clamping members and the insert, wherein the clamping members have elongate, longitudinally extending, clamping surfaces and the insert comprises a respective elongate, longitudinally extending, recess in its surface for each clamping member.

2. Pipe handling apparatus as claimed in claim 1 wherein there are 3, 4, 5, 6, 7 or 8 clamping members.

3. Pipe handling apparatus as claimed in claim 1 wherein the clamping members are disposed so that in use they contact the pipe to be handled at positions circumferentially around the wall of the pipe.

4. Pipe handling apparatus as claimed in claim 1 wherein each clamping member has a clamping surface which, in use, is brought into contact with the pipe to be handled.

5. Pipe handling apparatus as claimed in claim 4 wherein the clamping surface of one, more or each clamping member is arranged to extend axially along the length of the pipe to be handled.

6. Pipe handling apparatus as claimed in claim 4 wherein the clamping surface comprises teeth, grooves or other formations to increase grip between the clamping member and the pipe to be handled.

7. Pipe handling apparatus as claimed in claim 4 wherein the clamping surface comprises ball bearings.

8. Pipe handling apparatus as claimed in claim 4 wherein one, more or each clamping member is arranged so that the long axis of the elongate clamping surface is, in use, substantially aligned with the axis of the pipe to be handled.

9. Pipe handling apparatus as claimed in claim 1 wherein one, more or each clamping member has a wedge-shaped profile.

10. Pipe handling apparatus as claimed in claim 1 wherein the insert is substantially cylindrical.

11. Pipe handling apparatus as claimed in claim 10 wherein the insert is disposed substantially coaxially within an outer tube, so a space for receiving the pipe to be handled is defined between the insert and the outer tube.

12. Pipe handling apparatus as claimed in claim 11 wherein the space for receiving the pipe to be handled is substantially annular.

13. Pipe handling apparatus as claimed in claim 11 wherein one or more apertures are formed in a wall of the outer tube and one, more or each clamping member extends through, and is moveable relative to, a respective aperture towards and away from the insert.

14. Pipe handling apparatus as claimed in claim 13 wherein the or each aperture is an elongate slot.

15. Pipe handling apparatus as claimed in claim 14 wherein the long axis of the or each elongate slot is substantially aligned with the axis of the outer tube.

16. A flexible pipeline recovery tool comprising pipe handling apparatus as claimed in claim 1.

17. Pipe handling apparatus for recovering a flexible pipe from a seabed, comprising: an insert configured to be inserted into a pipe to be handled; a plurality of clamping members moveably mounted relative to the insert; and an actuator operable to urge the clamping members towards the insert such that the wall of the pipe to be handled can be gripped by the clamping members and the insert, wherein the insert is substantially cylindrical and is disposed substantially coaxially within an outer tube, so a space for receiving the pipe to be handled is defined between the insert and the outer tube, the apparatus further comprising a frame which is movable relative to the outer tube, the frame comprising one or more cam surfaces and each clamping member being in contact with a respective cam surface and arranged such that movement of the frame relative to the outer tube causes each clamping member to move towards or away from the insert.

18. Pipe handling apparatus as claimed in claim 17 where the actuator is disposed between the outer tube and the frame to effect relative moment between the outer tube and the frame.

19. Pipe handling apparatus as claimed in claim 18 wherein the actuator comprises one or more piston and cylinder assemblies disposed between the frame and a flange on the outer tube.

20. A method of handling a flexible pipe comprising multiple layers of metal strands comprising the steps of:
   a. providing pipe handling apparatus comprising: an insert configured to be inserted into a pipe to be handled; a plurality of clamping members moveably mounted relative to the insert; and an actuator operable to urge the clamping members towards the insert such that the wall of the pipe to be handled can be gripped by the clamping members and the insert, wherein the clamping members have elongate, longitudinally extending, clamping surfaces and the insert comprises a respective elongate, longitudinally extending, recess in its surface for each clamping member;
   b. introducing the insert into an end of the pipe to be handled; and
   c. operating the actuator thereby to grip the pipe.

* * * * *